(12) United States Patent
Saito et al.

(10) Patent No.: US 11,715,997 B2
(45) Date of Patent: Aug. 1, 2023

(54) DC MOTOR

(71) Applicant: HITACHI ASTEMO, LTD., Hitachinaka (JP)

(72) Inventors: Takafumi Saito, Ibaraki (JP); Yasuo Saito, Ibaraki (JP); Daisuke Yamashita, Ibaraki (JP); Keijirou Okabe, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/627,270

(22) PCT Filed: Jul. 10, 2020

(86) PCT No.: PCT/JP2020/026965
§ 371 (c)(1),
(2) Date: Jan. 14, 2022

(87) PCT Pub. No.: WO2021/010307
PCT Pub. Date: Jan. 21, 2021

(65) Prior Publication Data
US 2022/0255405 A1 Aug. 11, 2022

(30) Foreign Application Priority Data
Jul. 17, 2019 (JP) ................................ 2019-132092

(51) Int. Cl.
*H02K 11/026* (2016.01)
*H01R 39/38* (2006.01)
*H02K 5/14* (2006.01)

(52) U.S. Cl.
CPC ......... *H02K 11/026* (2013.01); *H01R 39/383* (2013.01); *H02K 5/148* (2013.01)

(58) Field of Classification Search
CPC .... H02K 5/148; H02K 11/026; H01R 39/381; H01R 39/383
See application file for complete search history.

(56) References Cited

U.S. PATENT DOCUMENTS

| | | | | |
|---|---|---|---|---|
| 4,340,831 A | * | 7/1982 | Kuhlmann | ............. H01R 39/40 310/239 |
| 7,413,041 B2 | * | 8/2008 | Drosendahl | ............ H02K 11/25 446/454 |

(Continued)

FOREIGN PATENT DOCUMENTS

| | | |
|---|---|---|
| CN | 203942401 U | 11/2014 |
| JP | 2008-252970 A | 10/2008 |
| KR | 10-1467538 B1 | 12/2014 |

OTHER PUBLICATIONS

International Search Report with English translation and Written Opinion issued in corresponding application No. PCT/JP2020/026965 dated Nov. 2, 2020.

*Primary Examiner* — Dang D Le
(74) *Attorney, Agent, or Firm* — Foley & Lardner LLP

(57) ABSTRACT

An object of the present invention is to provide a structure capable of stably removing noise. A DC motor includes: a brush in sliding contact with a commutator; a brush holder base holding the brush; a flexible wiring connected to the brush; and a choke coil connected to the brush via the wiring, wherein the brush holder base has a clamping portion restraining the wiring to extend along a direction parallel to a direction of a magnetic flux generated in the choke coil.

4 Claims, 6 Drawing Sheets

(56) References Cited

U.S. PATENT DOCUMENTS

2015/0028705 A1* 1/2015 Yamaguchi .......... H02K 13/006
                                                   310/72
2018/0278129 A1* 9/2018 Qin ..................... H02K 1/12

* cited by examiner

FIG. 3
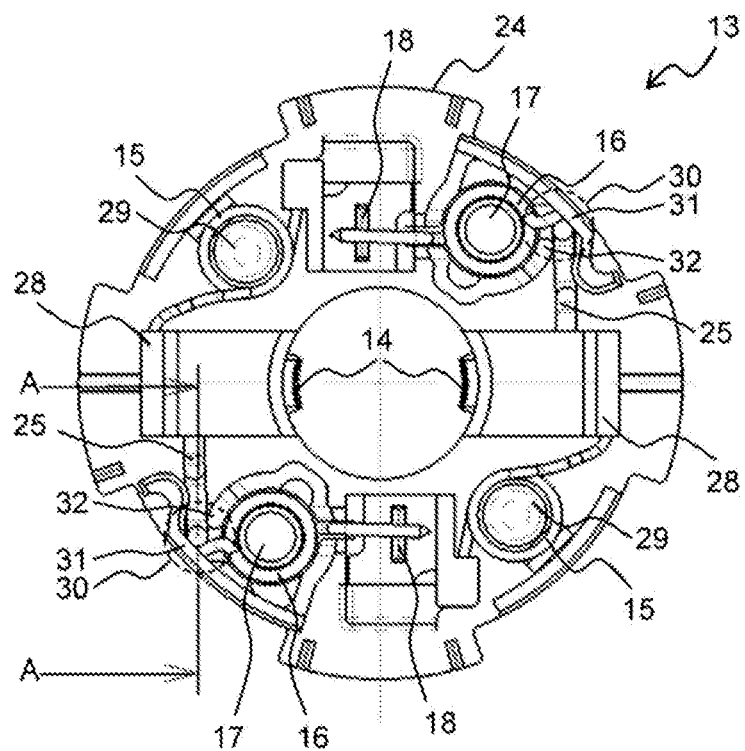
FIG. 4  CROSS SECTION TAKEN ALONG LINE A—A
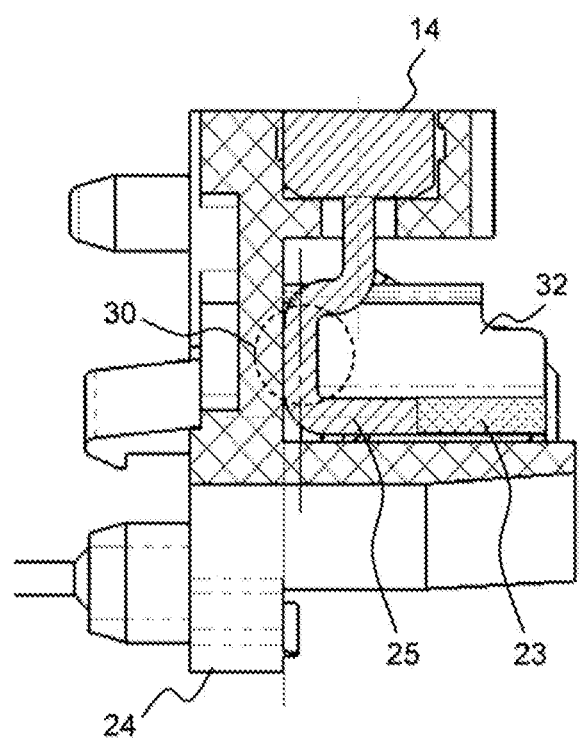

DC MOTOR

TECHNICAL FIELD

The present invention relates to a DC motor.

BACKGROUND ART

A DC motor with a brush generates an output by pressing the brush against a commutator with a spring for energization. Since the brush is worn and shortened because of its sliding movement on the commutator, it is necessary to follow a length of the brush using a spring, and a flexible wiring (pigtail) is formed to have an extra length when forming a circuit that electrically connects the brush to a power supply unit.

The background art of the present technical field includes the following prior art. PTL 1 (JP 2008-252970 A) discloses a motor including: a plurality of brushes in sliding contact with a commutator of an armature shaft; a brush holder onto which brush boxes accommodating the brushes in a projectable or retractable manner are attached; choke coils held by a main body of the brush holder, one ends of the choke coils being connected to the brushes; and terminals held by the brush holder, the other ends of the choke coils being electrically connected to the terminals, wherein after an opening is formed in a peripheral wall portion of the brush holder, and connection portions are arranged to be exposed between the other ends of the choke coils and the terminals in the opening of the brush holder, the other ends of the choke coils and the terminals are connected to each other by predetermined means.

CITATION LIST

Patent Literature

PTL 1: JP 2008-252970 A

SUMMARY OF INVENTION

Technical Problem

However, in many cases, the DC motor with the brush is incorporated in an actuator for operation, and demands for reductions in size and weight increase. Accordingly, a space allowed for the DC motor decreases, resulting in a decrease in distance between components. For this reason, in the small-sized DC motor with the brush, it is necessary to stably fix an extra length of a pigtail to suppress a degradation of a wiring and an occurrence of noise, which are caused due to the vibration of the pigtail. In addition, there is a demand for a structure capable of stably removing noise by providing a component (e.g., a choke coil) reducing rectification noise while not being affected by a magnetic flux according to a current flowing through the pigtail.

Solution to Problem

A representative example of the invention disclosed in the present application is as follows. That is, a DC motor includes: a brush in sliding contact with a commutator; a brush holder base holding the brush; a flexible wiring connected to the brush; and a choke coil connected to the brush via the wiring, wherein the brush holder base has a clamping portion restraining the wiring to extend along a direction parallel to a direction of a magnetic flux generated in the choke coil.

Advantageous Effects of Invention

According to the present invention, a stable noise removal effect can be obtained. Other problems, configurations, and effects that are not described above will be apparent from the embodiment to be described below.

BRIEF DESCRIPTION OF DRAWINGS

FIG. 3 is a plan view of a brush holder according to the embodiment of the present invention.

FIG. 4 is a cross-sectional view of the brush holder taken along line A-A according to the embodiment of the present invention.

DESCRIPTION OF EMBODIMENTS

Hereinafter, an embodiment of a DC motor will be described with reference to FIGS. 1 to 8.

Figure 1:
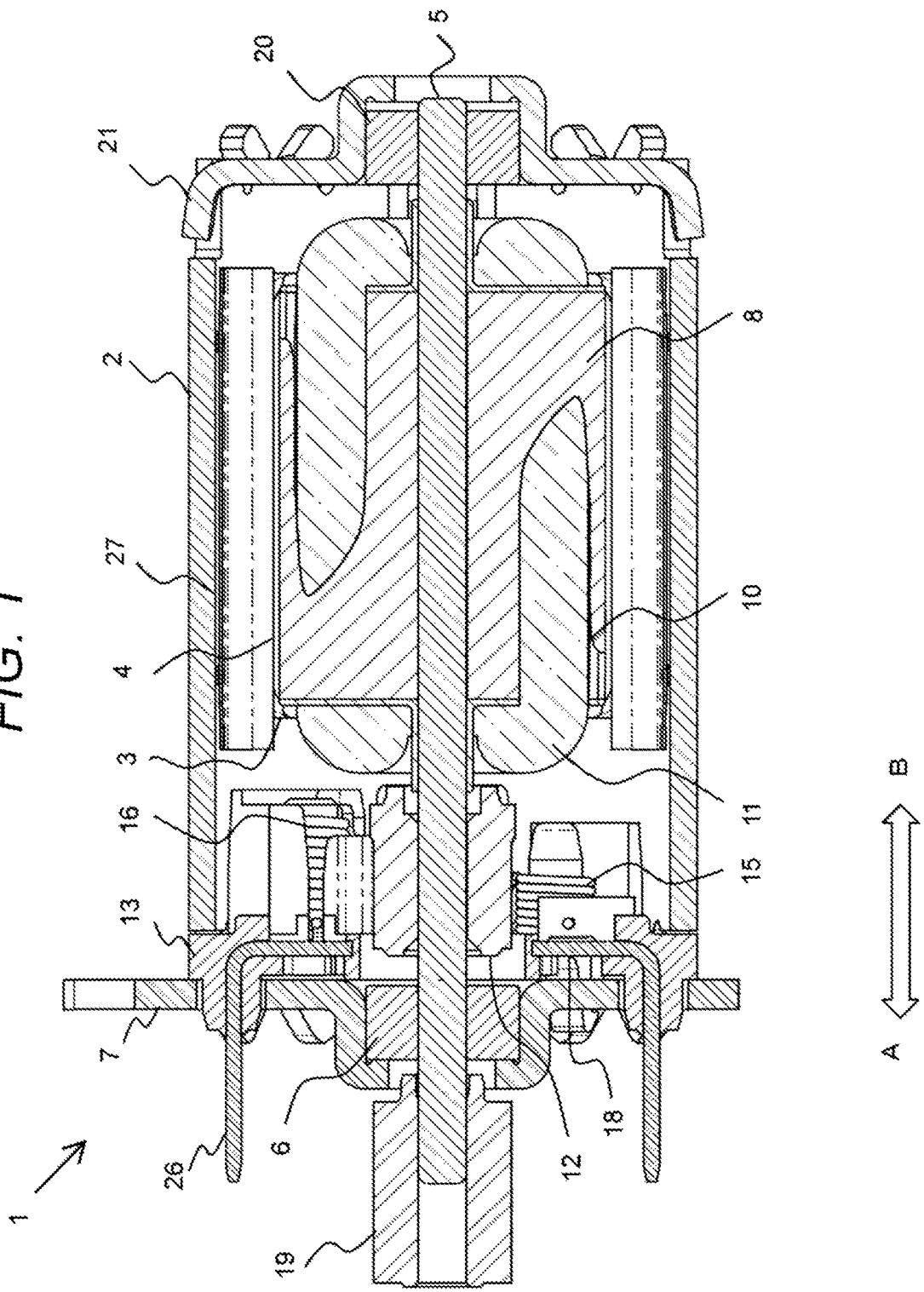
FIG. 1 is a cross-sectional view illustrating a structure of a DC motor according to an embodiment of the present invention.
Figure 2:
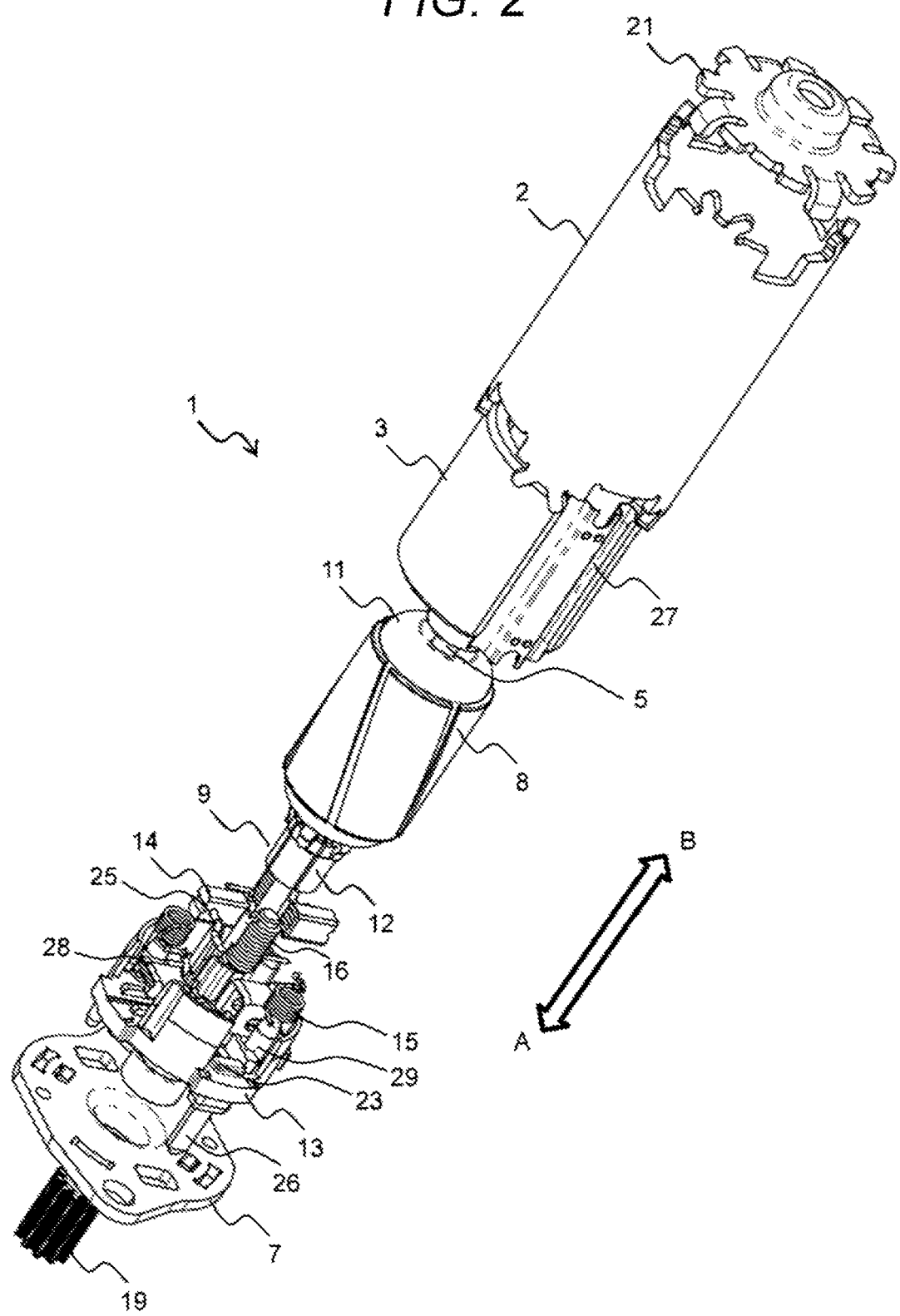
FIG. 2 is an exploded perspective view of the DC motor according to the embodiment of the present invention.

(Overall Configuration) FIG. 1 is a cross-sectional view illustrating a structure of a DC motor 1, and FIG. 2 is an exploded perspective view of the DC motor 1. Note that A and B shown in FIGS. 1 and 2 are used for convenience in indicating directions of the DC motor 1, particularly, directions of the brush holder 13. Hereinafter, an A-side surface of the brush holder 13 will also be referred to as "surface A", and a B-side surface of the brush holder 13 will also be referred to as "surface B". Note that the surface B is a surface onto which brushes 14, which will be described later, are attached.

The DC motor 1 includes a yoke 2 that serves to form a case and a magnetic circuit. A magnet stay 27 and a plurality of magnets 3 are mounted on an inner surface of the yoke 2, and an armature 4 is further accommodated around inner surfaces of the magnets 3 with a certain gap from the inner surfaces of the magnets. A shaft 5 connected to a motor gear 19 is provided in a central portion of the armature 4 in a radial direction. The shaft 5 is rotatably supported by a front bracket 7 and a rear bracket 21 via a bearing 6 and a bearing 20. The front bracket 7 and the rear bracket 21 are attached to the yoke 2. The armature 4 is configured by fixing an armature core 8 and a commutator 9 to the shaft 5. An armature coil 11 is wound across a plurality of slots 10 formed in an outer peripheral portion of the armature core 8 in a circumferential direction. The commutator 9 is formed of an insulating material such as a resin in a cylindrical shape, and includes a plurality of commutator pieces 12 made of a conductive material on an outer peripheral portion of the commutator 9. The armature coil 11 wound between the slots 10 is electrically joined to some of the commutator pieces 12.

A brush holder 13 is accommodated in the yoke 2. At least a pair of brushes 14 supplying power to the commutator pieces 12 and springs 15 are disposed on the brush holder 13. Choke coils 16 for removing electromagnetic noise are further disposed on the brush holder 13. The brushes 14 are electrically connected to external power supply terminals 26 of the DC motor 1. The brushes 14 are in sliding contact with outer peripheral surfaces of the commutator pieces 12 by the elasticity of the springs 15 held by the brush holder 13 to supply power to the armature coil 11 via the commutator pieces 12.

Figure 5:
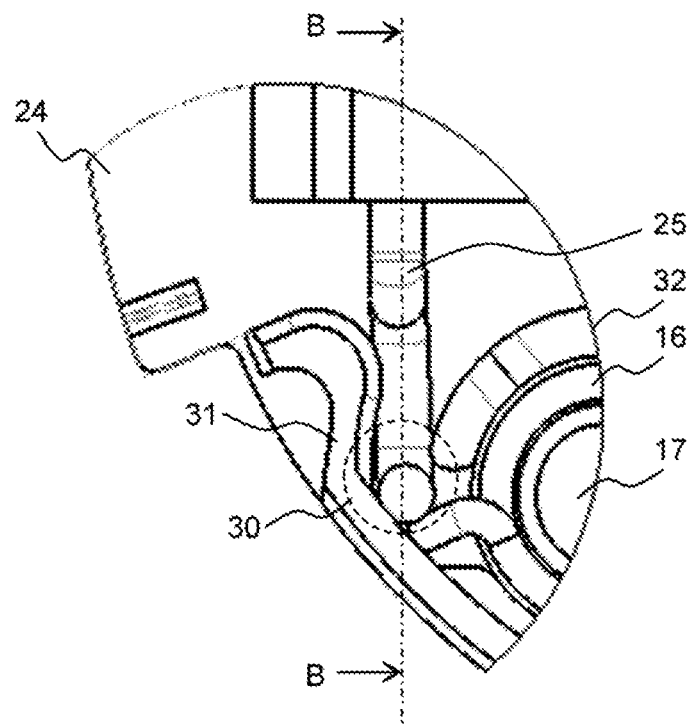
FIG. 5 is an enlarged view of a clamping portion of the brush holder according to the embodiment of the present invention.
Figure 6:
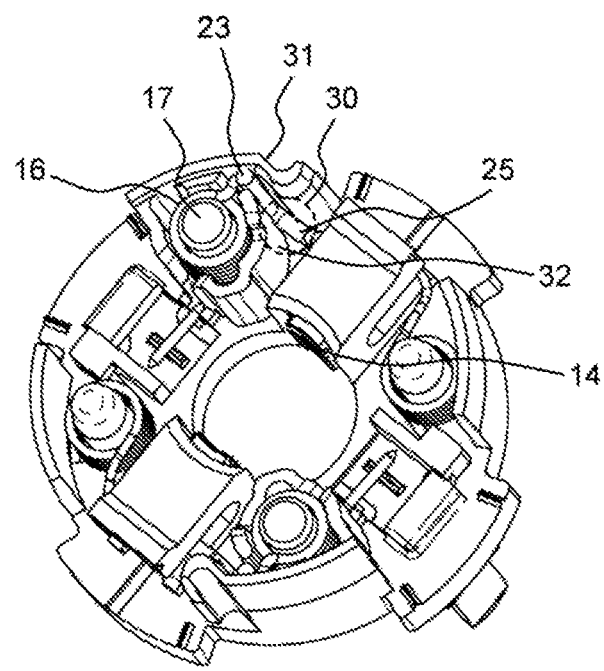
FIG. 6 is a perspective view of the brush holder according to the embodiment of the present invention.

(Brush Holder) FIG. 3 is a plan view of the brush holder 13 when viewed from above the surface B, FIG. 4 is a cross-sectional view taken along line A-A, FIG. 5 is an enlarged view of a clamping portion 30, and FIG. 6 is a perspective view of the brush holder 13.

The brush holder 13 is configured by disposing a plurality of components on a brush holder base 24 formed of an insulating material such as a resin in a substantially circular shape. Brushes 14, springs 15, choke coils 16, brush boxes 28, spring holders 29, etc. are disposed on a surface of the brush holder base 24 onto which the brushes 14 are attached, that is, the surface B. The brush boxes 28 hold the brushes 14. The spring holders 29 hold the springs 15. The brushes 14 supply power to the commutator pieces 12. The springs 15 bring the brushes 14 into sliding contact with an outer periphery of the commutator 9 (the commutator pieces 12). The choke coils 16 remove electromagnetic noise. Ferrite cores 17 are provided at the centers of the choke coils 16.

Power supply terminals 18 for connecting the choke coils 16 are disposed in the brush holder base 24 by an insert molding method or the like, and the power supply terminals 18 are exposed to both the surface A and the surface B of the brush holder base 24. In the brush holder as illustrated, the power supply terminal 18 in the brush holder base 24 and the external power supply terminal 26 of the DC motor 1 are integrally formed, but the power supply terminal 18 and the external power supply terminal 26 may be joined to each other as a separate component.

The choke coil 16 is accommodated in a space formed by an accommodation wall protruding substantially vertically from the surface B of the brush holder base 24, and one end of the choke coil 16 is connected to the power supply terminal 18 and the other end of the choke coil 16 is connected to a pigtail wire 25 at a connection portion 23. Accordingly, the power supply terminal 18 is electrically connected to the brush 14 via the pigtail wire and the choke coil 16, and supplies power to the armature coil 11 via the commutator piece 12 in sliding contact with the brush 14.

One end of the pigtail wire 25 is connected to the brush 14, and the other end of the pigtail wire 25 is connected to the choke coil 16 via the connection portion 23. The pigtail wire 25 and the brush 14, and the pigtail wire 25 and the connection portion 23 may be connected to each other by a welding method or the like. The pigtail wire 25 is flexible and has an extra length to follow the wear of the brush.

A clamping portion 30 restraining the pigtail wire 25 is provided between the brush 14 and the choke coil 16. The clamping portion 30 is formed between a first wall portion 31 extending an outward portion of the accommodation wall accommodating the choke coil 16 and a second wall portion 32 which is an inward portion of the accommodation wall, and forms a space slightly narrower than a diameter of the pigtail wire 25. The clamping portion 30 is formed between a first wall portion 31 formed by extending the accommodation wall accommodating the choke coil 16 on an outer peripheral side of the brush holder base 24 and a second wall portion 32 formed by the accommodation wall accommodating the choke coil 16 on an inward side of the brush holder base 24, and forms a space slightly narrower than a diameter of the pigtail wire 25. Therefore, in a state after the pigtail wire 25 is assembled to the brush holder base 24, the pigtail wire 25 is restrained by the clamping portion 30 not to move. That is, the clamping portion 30 suppresses the vibration displacement of the pigtail wire 25, and enables the pigtail wire 25 to be disposed in parallel to the center line of the choke coil 16. That is, the pigtail wire 25 extends in parallel to a direction of a magnetic flux generated in the choke coil 16. Here, the meaning of the pigtail wire 25 being parallel to the direction of the magnetic flux generated in the choke coil 16 may allow an error up to ±12° as a difference in direction between the pigtail wire 25 and the magnetic flux generated in the choke coil 16. In addition, a change in inductance of the choke coil 16 may be allowed up to 20%.

Figure 7:
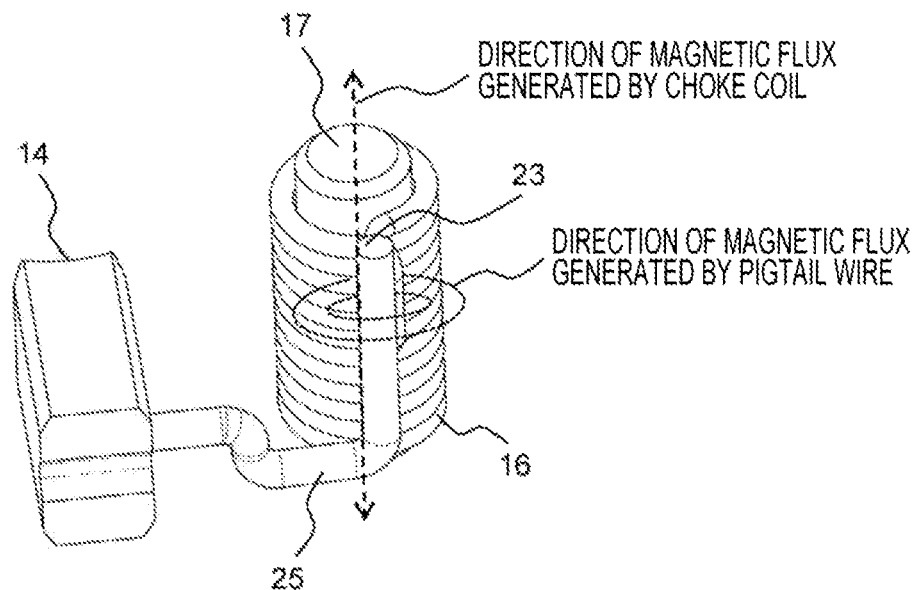
FIG. 7 is a perspective view illustrating directions in which magnetic fluxes of a choke coil and a pigtail wire are generated according to the embodiment of the present invention.
Figure 8:
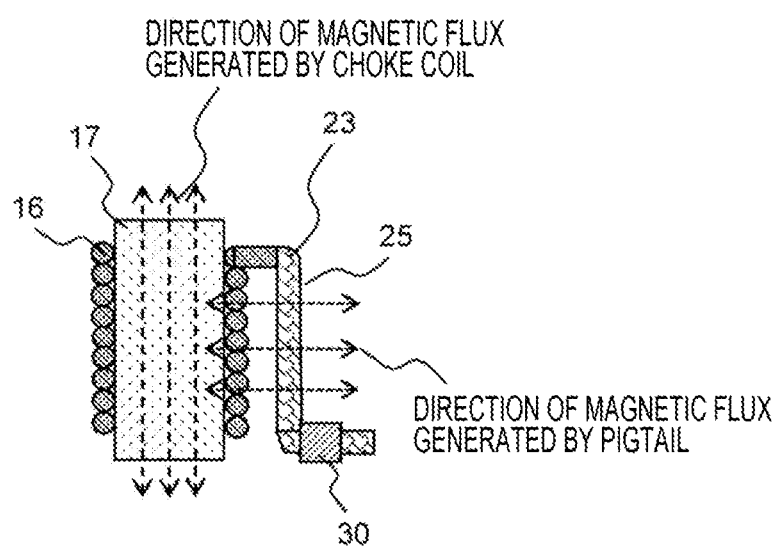
FIG. 8 is a cross-sectional view illustrating the directions in which the magnetic fluxes of the choke coil and the pigtail wire are generated according to the embodiment of the present invention.

FIG. 7 is a perspective view illustrating directions in which magnetic fluxes are generated, and FIG. 8 is a cross-sectional view taken along line B-B of FIG. 5. In addition, FIG. 9 is a cross-sectional view in a conventional configuration.

As illustrated in FIGS. 7 and 8, when the DC motor 1 is energized, a magnetic flux according to a current flowing through the choke coil 16 is generated in a direction to pass through the center of the choke coil 16, and a magnetic flux according to a current flowing through the pigtail wire 25 is generated in a direction to draw a circle around the pigtail wire 25. Therefore, the magnetic flux according to the current flowing through the choke coil 16 and the magnetic flux according to the current flowing through the pigtail wire 25 are orthogonal to each other, and the interference of the magnetic flux generated by the current flowing through the pigtail wire 25 with the choke coil 16 is suppressed.

Figure 9:
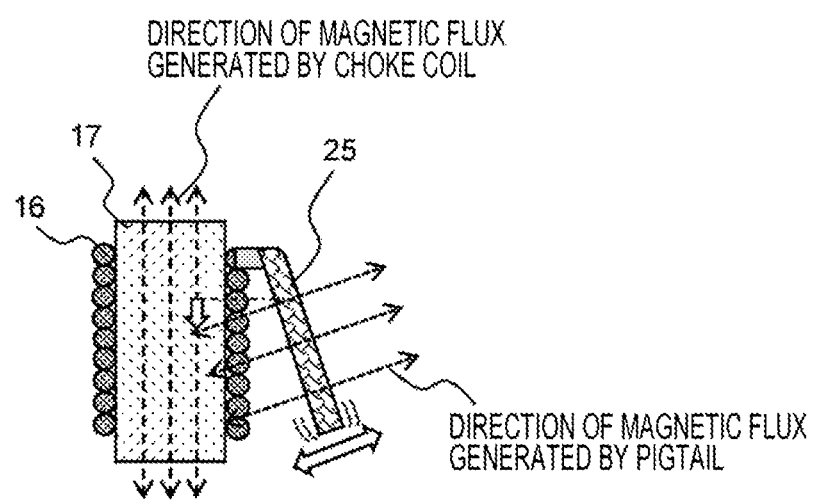
FIG. 9 is a cross-sectional view illustrating directions in which magnetic fluxes of a choke coil and a pigtail wire are generated according to the conventional art.

On the other hand, as illustrated in FIG. 9, when the pigtail wire 25 is not parallel to the center line of the choke coil 16, the magnetic flux according to the current flowing through the choke coil 16 and the magnetic flux according to the current flowing through the pigtail wire 25 are not orthogonal to each other, and the magnetic flux according to the current flowing through the pigtail wire 25 interferes with the magnetic flux of the choke coil 16 in proportion to a sine value of an angle formed by the pigtail wire 25 and the center line of the choke coil 16. Therefore, element characteristics of the choke coil 16 become unstable, and a noise suppression effect is reduced.

In addition, when the pigtail wire 25 is not restrained by the clamping portion 30, the pigtail wire 25 is displaced due to the vibration of the DC motor 1, and an amount of interference of the magnetic flux according to the current flowing through the pigtail wire 25 with the magnetic flux of the choke coil 16 changes with time, thereby generating noise.

As described above, a DC motor 1 according to an embodiment of the present invention includes a brush 14 in sliding contact with a commutator 9, a brush holder base 24 holding the brush 14, a flexible wiring (a pigtail wire 25) connected to the brush 14, and a choke coil 16 connected to the brush 14 via the pigtail wire 25, and the brush holder base 24 has a clamping portion 30 restraining the pigtail wire 25 to extend along a direction parallel to a direction of a magnetic flux generated in the choke coil 16. That is, since the pigtail wire 25 is inserted into the clamping portion 30, it is possible to suppress the damage of the pigtail wire 25 caused by the vibration of the DC motor 1, and it is also possible to suppress the interference of the change in magnetic flux that occurs due to the vibration displacement of the pigtail wire 25 in the vicinity of the choke coil 16 with the choke coil 16, so that element characteristics can be stabilized, and a stable noise removal effect can be obtained. In addition, since the pigtail wire 25 extends in parallel to a direction of a magnetic field generated in the choke coil 16, a direction of a magnetic flux according to a current flowing through the pigtail wire 25 is orthogonal to a direction of a magnetic flux according to a current flowing through the choke coil 16, so that the magnetic flux interference of the wiring with the choke coil 16 can be suppressed, thereby stabilizing element characteristics of the choke coil 16, and obtaining a stable noise removal effect. Further, the clamping portion 30 restrains a creeping portion of the pigtail wire 25 for an extra length. Thus, it is possible to reduce a cost for processing the pigtail wire 25 to be shortened in a subsequent process.

In addition, since the clamping portion 30 restrains the pigtail wire 25 between the brush 14 and the choke coil 16, the vibration of the brush 14 does not propagate to a connection portion 23 between the choke coil 16 and the pigtail wire 25, so that vibration resistance can be improved.

In addition, the clamping portion 30 is formed between a first wall portion 31 and a second wall portion 32 protruding from the brush holder base 24, the pigtail wire 25 can be reliably restrained while simplifying a structure of the brush holder base 24.

In addition, an accommodation wall accommodating the choke coil 16 is formed on the brush holder base 24, the first wall portion 31 is formed by extending an outward portion of the accommodation wall, and the second wall portion 32 is an inward portion of the accommodation wall. Since the first wall portion 31 and the second wall portion 32 are configured to be continuous from each other in the accommodation wall forming a space accommodating the choke coil 16, the pigtail wire 25 can be reliably restrained while simplifying a structure of the brush holder base 24.

Note that the present invention is not limited to the above-described embodiment, and covers various modifications and equivalents within the spirit of the appended claims. For example, the above-described embodiment has been described in detail in order to explain the present invention in an easy-to-understand manner, and the present invention is not necessarily limited as having all the above-described configurations. In addition, some of the configurations of one embodiment may be replaced with configurations of another embodiment. In addition, configurations of one embodiment may be added to configurations of another embodiment. In addition, other configurations may be added to some of the configurations of each embodiment, other configurations may be deleted from some of the configurations of each embodiment, or some of the configurations of each embodiment may be replaced with other configurations.

REFERENCE SIGNS LIST

1 DC motor
2 yoke
3 magnet
4 armature
5 shaft
6 bearing
7 front bracket
8 armature core
9 commutator
10 slot
11 armature coil
12 commutator piece
13 brush holder
14 brush
15 spring
16 choke coil
17 ferrite core
18 power supply terminal
19 motor gear
20 bearing
21 rear bracket
23 connection portion
24 brush holder base
25 pigtail wire
26 external power supply terminal
27 magnet stay
28 brush box
29 spring holder
30 clamping portion
31 first wall portion
32 second wall portion

The invention claimed is:

1. A DC motor comprising:
a brush in sliding contact with a commutator;
a brush holder base holding the brush;
a wiring connected to the brush; and
a choke coil connected to the brush via the wiring, wherein the brush holder base has a clamping portion restraining the wiring to extend along a direction parallel to a direction of a magnetic flux generated in the choke coil wherein the wiring has a first portion, a second portion and a third portion, one end of the first portion contacting the second portion, another end of the first portion contacting the third portion, the first portion extending along an extension direction being the direction of the magnetic flux generated in the choke coil, the second portion and the third portion extending along directions away from the extension direction, the clamping portion contacting only the first portion.

2. The DC motor according to claim 1, wherein the clamping portion restrains the wiring between the brush and the choke coil.

3. The DC motor according to claim 1, wherein the clamping portion is formed between a first wall portion and a second wall portion protruding from the brush holder base.

4. The DC motor according to claim 3, wherein
an accommodation wall accommodating the choke coil is formed on the brush holder base,
the first wall portion is formed by extending an outward portion of the accommodation wall, and
the second wall portion is an inward portion of the accommodation wall.

* * * * *